US009007189B1

(12) United States Patent
Curtis et al.

(10) Patent No.: US 9,007,189 B1
(45) Date of Patent: Apr. 14, 2015

(54) PROVIDING LEADERBOARD BASED UPON IN-GAME EVENTS

(71) Applicant: Kabam, Inc., San Francisco, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 135 days.

(21) Appl. No.: 13/861,246

(22) Filed: Apr. 11, 2013

(51) Int. Cl.
A63B 69/00 (2006.01)
A63F 11/00 (2006.01)

(52) U.S. Cl.
CPC .................................. A63F 11/0051 (2013.01)

(58) Field of Classification Search
CPC .......... A63F 2300/558; A63F 11/0051; A63B 71/0669; G07F 17/3276
USPC ...................... 340/323 R; 700/92, 91; 463/42
See application file for complete search history.

(56) References Cited

U.S. PATENT DOCUMENTS

| 5,816,918 | A | 10/1998 | Kelly et al. ...................... 463/16 |
| 7,050,868 | B1 | 5/2006 | Graepel .......................... 700/93 |
| 7,156,733 | B2 | 1/2007 | Chiang et al. ...................... 463/1 |
| 7,192,352 | B2 | 3/2007 | Walker et al. ................... 463/42 |
| 7,326,115 | B2 | 2/2008 | Baerlocher ..................... 463/25 |
| 7,813,821 | B1 | 10/2010 | Howell .......................... 700/91 |
| 7,819,749 | B1 * | 10/2010 | Fish et al. ....................... 463/42 |
| 8,066,571 | B2 | 11/2011 | Koster et al. ................... 463/42 |
| 8,147,340 | B2 | 4/2012 | Brunet De Courssou et al. ................................ 463/42 |
| 8,231,453 | B2 | 7/2012 | Wolf et al. ...................... 463/20 |
| 8,231,470 | B2 | 7/2012 | Feeney et al. .................. 463/42 |
| 8,246,439 | B2 | 8/2012 | Kelly et al. ..................... 463/20 |
| 8,272,934 | B2 | 9/2012 | Olive et al. ..................... 463/16 |
| 8,272,951 | B2 | 9/2012 | Ganz .............................. 463/29 |
| 8,287,367 | B2 | 10/2012 | Hall et al. ....................... 463/29 |
| 8,313,372 | B2 | 11/2012 | Naicker et al. ................. 463/25 |
| 8,317,584 | B2 | 11/2012 | Aoki et al. ...................... 463/13 |
| 8,323,110 | B2 | 12/2012 | Shibamiya et al. ............. 463/42 |
| 8,328,642 | B2 | 12/2012 | Mosites et al. ................. 463/42 |

(Continued)

FOREIGN PATENT DOCUMENTS

WO   WO 2013/059639   4/2013

OTHER PUBLICATIONS

New Feature: Tiered Tournaments and Tournament Updates, printed from http://community.kabam.com/forums/showthread.php?171349-New-Feat on Feb. 11, 2014, 2 pages.

(Continued)

Primary Examiner — Thomas Mullen
(74) Attorney, Agent, or Firm — Pillsbury Winthrop Shaw Pittman LLP

(57) ABSTRACT

An approach to facilitate providing leaderboards based upon in-game events within a game space. The leaderboards based on user progress to achieving one or more administrator defined objectives within the game space, where each objective requires the completion of one or more activities. An objective metric for the first user, indicating the first user's progress toward achieving the objective may be determined, based upon one or more activity metric values for the first user. The activity metric values providing an indication of the first user's progress toward completing activities required to be completed to achieve the objective, as defined by an administrator.

20 Claims, 3 Drawing Sheets

(56) References Cited

U.S. PATENT DOCUMENTS

| | | | |
|---|---|---|---|
| 8,332,544 B1 | 12/2012 | Ralls | 710/8 |
| 8,348,762 B2 | 1/2013 | Willis | 463/42 |
| 8,348,768 B2 | 1/2013 | Auterio et al. | 463/42 |
| 8,360,868 B2 | 1/2013 | Shvili | 463/27 |
| 8,366,550 B2 | 2/2013 | Herrmann et al. | 463/42 |
| 8,382,572 B2 | 2/2013 | Hoffman | 463/20 |
| 8,388,427 B2 | 3/2013 | Yariv | 463/9 |
| 8,408,989 B2 | 4/2013 | Bennett et al. | 463/20 |
| 8,475,262 B2 | 7/2013 | Wolf et al. | 463/20 |
| 8,506,394 B2 | 8/2013 | Kelly et al. | 463/29 |
| 8,583,266 B2 | 11/2013 | Herbrich et al. | 700/93 |
| 8,784,214 B2 | 7/2014 | Parks et al. | 463/42 |
| 8,831,758 B1 | 9/2014 | Chu et al. | 700/91 |
| 2002/0094863 A1 | 7/2002 | Klayh | 463/21 |
| 2002/0115488 A1 | 8/2002 | Berry et al. | 463/42 |
| 2002/0119824 A1 | 8/2002 | Allen | 463/42 |
| 2002/0183105 A1 | 12/2002 | Cannon et al. | 463/16 |
| 2002/0193162 A1 | 12/2002 | Walker et al. | 463/42 |
| 2003/0008713 A1 | 1/2003 | Ushiro et al. | 463/42 |
| 2003/0190960 A1 | 10/2003 | Jokipii et al. | 463/42 |
| 2004/0225387 A1 | 11/2004 | Smith, III | 700/92 |
| 2005/0096117 A1 | 5/2005 | Katz et al. | 463/17 |
| 2006/0217198 A1 | 9/2006 | Johnson | 463/40 |
| 2006/0287102 A1 | 12/2006 | White et al. | 463/42 |
| 2007/0021213 A1 | 1/2007 | Foe et al. | 463/42 |
| 2007/0111770 A1 | 5/2007 | Van Luchene | 463/7 |
| 2007/0129147 A1 | 6/2007 | Gagner | 463/42 |
| 2007/0191101 A1 | 8/2007 | Coliz et al. | 463/42 |
| 2007/0191102 A1 | 8/2007 | Coliz et al. | 463/42 |
| 2007/0213116 A1 | 9/2007 | Crawford et al. | 463/16 |
| 2008/0171599 A1 | 7/2008 | Salo et al. | 463/41 |
| 2008/0200260 A1 | 8/2008 | Deng | 463/42 |
| 2009/0315893 A1 | 12/2009 | Smith et al. | 345/473 |
| 2010/0022307 A1 | 1/2010 | Steuer et al. | 463/42 |
| 2010/0070056 A1 | 3/2010 | Coronel | 700/91 |
| 2010/0099471 A1 | 4/2010 | Feeney et al. | 463/1 |
| 2010/0107214 A1 | 4/2010 | Ganz | 726/1 |
| 2010/0113162 A1 | 5/2010 | Vemuri et al. | 463/42 |
| 2010/0210356 A1 | 8/2010 | Losica | 463/26 |
| 2010/0227682 A1 | 9/2010 | Reville et al. | 463/29 |
| 2010/0306015 A1 | 12/2010 | Kingston | 705/8 |
| 2011/0065511 A1 | 3/2011 | Mahan | 463/40 |
| 2011/0111841 A1 | 5/2011 | Tessmer | 463/25 |
| 2011/0112662 A1 | 5/2011 | Thompson | 700/91 |
| 2011/0218033 A1 | 9/2011 | Englman et al. | 463/25 |
| 2011/0227919 A1 | 9/2011 | Bongio et al. | 345/426 |
| 2011/0256936 A1 | 10/2011 | Walker et al. | 463/42 |
| 2011/0281654 A1 | 11/2011 | Kelly et al. | 463/42 |
| 2011/0319170 A1 | 12/2011 | Shimura et al. | 463/42 |
| 2012/0015714 A1 | 1/2012 | Ocko et al. | 463/25 |
| 2012/0015715 A1 | 1/2012 | Luxton et al. | 463/25 |
| 2012/0034961 A1 | 2/2012 | Berman et al. | 463/6 |
| 2012/0083909 A1 | 4/2012 | Carpenter et al. | 700/92 |
| 2012/0156668 A1 | 6/2012 | Zelin | 434/362 |
| 2012/0157187 A1 | 6/2012 | Moshal | 463/25 |
| 2012/0166449 A1 | 6/2012 | Pitaliya | 707/748 |
| 2012/0178514 A1 | 7/2012 | Schulzke et al. | 463/17 |
| 2012/0226573 A1 | 9/2012 | Zakas et al. | 705/26.2 |
| 2012/0244947 A1 | 9/2012 | Ehrlich | 463/42 |
| 2012/0244950 A1 | 9/2012 | Braun | 463/42 |
| 2012/0256377 A1 | 10/2012 | Schneider et al. | 273/292 |
| 2012/0282986 A1 | 11/2012 | Castro | 463/1 |
| 2012/0311504 A1 | 12/2012 | Van Os et al. | 715/853 |
| 2012/0322545 A1 | 12/2012 | Arnone et al. | 463/25 |
| 2012/0322553 A1 | 12/2012 | Kohlhoff | 463/42 |
| 2012/0330785 A1 | 12/2012 | Hamick et al. | 705/26.41 |
| 2013/0006735 A1 | 1/2013 | Koenigsberg et al. | 705/14.12 |
| 2013/0013094 A1* | 1/2013 | Parks et al. | 700/92 |
| 2013/0013326 A1* | 1/2013 | Miller et al. | 705/1.1 |
| 2013/0029745 A1 | 1/2013 | Kelly et al. | 463/19 |
| 2013/0090750 A1 | 4/2013 | Herrman et al. | 700/92 |
| 2013/0123005 A1 | 5/2013 | Allen et al. | 463/29 |
| 2013/0151342 A1 | 6/2013 | Citron et al. | 705/14.64 |
| 2013/0178259 A1 | 7/2013 | Strause et al. | 463/6 |
| 2013/0237299 A1 | 9/2013 | Bancel et al. | 463/9 |
| 2013/0344932 A1 | 12/2013 | Adams et aL | 463/17 |
| 2014/0018156 A1* | 1/2014 | Rizzotti et al. | 463/42 |

OTHER PUBLICATIONS

Wikipedia, Mafia Wars, <http://en.wikipedia.org/wiki/Mafia_Wars>, Jan. 28, 2012, 3 pages.

\* cited by examiner

PROVIDING LEADERBOARD BASED UPON IN-GAME EVENTS

FIELD OF THE DISCLOSURE

This disclosure relates to providing leaderboards in online games, in particular providing leaderboards based upon in-game events within a game space.

BACKGROUND

Leaderboards for games are known. Previously, leaderboards have been used to represent the high score of all users playing a game. The games usually have a single leaderboard viewable by every player within the game, such that only the players with the highest scores appear on the leaderboard for the game.

Such leaderboards offer limited incentive to new players who will have to put in many tens, or even hundreds, of hours of game play before having a chance to appear on the game's leaderboard. Similarly, leaderboards specific to parts of the game are unavailable to display a user's relative hierarchy, or ranking, compared to a subset of players within the game. The leaderboards often feature highest scores from all players within the game, missing the opportunity of incentivizing the user by displaying to the user a leaderboard featuring a subset of users.

SUMMARY

One aspect of the disclosure relates to providing users with leaderboards based upon in-game events within a game space. A game may have many leaderboards associated with different elements within the game. For example, the game may have one or more administrator-defined objectives. Individual ones of the one or more objectives may have associated activities which are required to be completed to achieve the objective. There may be provided a leaderboard for each objective and/or each associated activity displaying the hierarchy of each user with respect to other users in accomplishing the objective and/or completing the activities. Providing leaderboards for each objective and/or activity incentivizes users to keep working toward the particular objective, improving player retention. By providing leaderboards for sub-elements of the game, instead of only providing a single high-score leaderboard, creates increased opportunity for a user to feature on a leaderboard early in the game, increasing the incentive to the user to play, and improving user retention and monetization.

The leaderboards may feature a subset of users from the pool of all users playing the game or working toward achieving the objective. The subset of users may be affiliated or associated with the user to which the leaderboard is presented. The subset of users may be selected based on an indication of one or more user parameters. Such user parameters may include an indication that users commonly interact within the game space, electronic social media associations, geographical location of the users, groups, guilds or alliances that the user belongs to, an indication of the user's real-world affiliations, and/or other user parameters indicating the user has a connection or a similarity with one or more other users.

Providing leaderboards featuring a subset of users having a common attribute and/or affiliation, increases competitiveness in the users, providing an incentive to continue playing, improving user retention and monetization.

The system may include one or more servers. The server(s) may be configured to communicate with one or more client computing platforms according to a client/server architecture. The users may access the system via the client computing platforms. Client computing platforms may include, but not be limited to, personal computers, laptops, and/or hand-held devices such as smartphones, tablets, and PDAs. The server(s) may be configured to communicate with the one or more client computing platforms through a network, such as the Internet. Web servers may be utilized to facilitate communication between the server(s) and the client computing platforms, where web servers host one or more websites associated with the online game.

The server(s) may be configured to execute one or more computer program modules to facilitate providing leaderboards to users based on in-game events. The computer program modules may include one or more of a game module, an objective module, an activity monitoring module, an objective monitoring module, a progress presentation module, a motivation module and/or other modules. In some implementations, the client computing platforms may be configured to execute one or more computer program modules that are the same as or similar to the computer program modules of the server(s) to facilitate providing leaderboards to users based on in-game events.

The game module may be configured to execute an instance of an online game. The game module may be further configured to implement the instance of the online game to facilitate interaction of the users with the game. The game module may be configured to execute an instance of a virtual environment, in which the online game may be implemented. The game module may be configured to facilitate presentation of the virtual environment to the user. The game module may also be configured to facilitate interaction of the users with the online game by executing actions in the instance of the online game in response to receiving action requests from the users. In other implementations, the game module may be configured to execute an instance of a two-dimensional online game, whereby users interact with the two-dimensional game through the client computing platforms.

The objective module may be configured to obtain an objective definition of an administrator specified objective to be achieved by users of the game as part of a limited time event. The users' progress toward achieving the objective may be automatically presented to the users individually in a user-specific leaderboard, as discussed below. The objective may require one or more activities in the game associated with the objective to be completed by users. The user's progress toward completing the activities may be automatically presented to users individually in a user-specific leaderboard, as discussed below.

The objective may be a time-limited event within the main game of the online game. Examples of administrator-defined objectives may include at least one of exploring a map, researching a technology or skill, purchasing an in-game item, harvesting a specified type of resource, defeating one or more other players in player-versus-player combat, defeating non-player characters, participating and completing player-versus-environment activities, completing quests, and/or completing an in-game achievement. Other administrator-defined objectives may include occupying a particular area of a virtual environment, cultivating a defined amount and/or variety of a particular product or resource, building a game item, such as a city or building, forming an alliance with other users, progressing to another level within the game, and/or any other objective which may be defined by an administrator.

The activity monitoring module may be configured to determine one or more activity metrics for the users in response to the objective being obtained. The activity metrics may be based upon the users' progress toward completing the activities defined in the objective definition. The activity monitoring module may be configured to determine a first activity metric value for a first user based upon the first user's progress toward completing a first activity. An objective may have one or more associated activities, whereby the activities are required to be completed before the objective can be accomplished.

The associated activities may be defined by an administrator, or one or more computer program modules may be able to determine the associated activities from the definition of the objective defined by an administrator. As a non-limiting example, the objective may be to complete a quest within the game. To complete the quest the player may be required to obtain an object B to defeat a non-player character C. The definition of the administrator-defined objective may include the requirements to complete a first activity, related to obtaining the object B, and a second activity, related to defeating the non-player character C. In other implementations, the one or more computer programs may be configured to determine, upon an administrator defining an objective as requiring users to complete a quest, that users must obtain an object B in order to defeat non-player character C. The activity monitoring module may be configured to determine a first activity metric value indicating the user's progress toward obtaining object B, and a second activity metric value indicating the user's progress toward defeating non-player character C, in response to the objective being defined.

Some activities required to be completed to achieve an objective require the user to undertake one or more actions. Such that, individual ones of the one or more activities require users to complete multiple actions defined in the objective definition, such that a third activity requires users to complete a first action and a second action. For example, to obtain an object B, necessary in order to complete a quest, the user may be required to perform actions D and E. The performance of actions D and E may be defined by an administrator as being required in order for a user to obtain object B. In alternative implementations, the one or more computer program modules may be configured to determine that obtaining object B requires the performance of actions D and E.

The activity monitoring module may be configured to determine a first action metric value and a second action metric value for the first user indicating the first user's progress toward completing the first action and the second action. For example, the first action metric value may be associated with a progress toward performance of action D, and the second action metric value may be associated with a progress toward performance of action E. The activity monitoring module may be configured to determine the third activity metric value indicating the first user's progress toward completing the third activity, based on the first action metric value and the second action metric value. The activity monitoring module may be configured to account for a difference in respective contributions, toward the user's progress toward completing the third activity, from the first action metric value and the second action metric value when determining the third activity metric value.

The objective monitoring module may be configured to determine an objective metric for the users indicating the users' progress toward achieving the objective. The users' progress toward achieving the objective may be based upon the one or more activity metrics for the user. The objective monitoring module may be configured to determine a first objective metric value for the first user based upon the first activity metric value for the first user. The objective monitoring module may be configured to determine a first objective metric value for the first user based on a second activity metric for the first user, such that the first activity metric and the second activity metric may indicate the first user's progress of two otherwise distinct activities, in furtherance of achieving the defined objective.

Different activities, required to be completed to achieve the objective, may have different associated complexities and/or time requirements, providing activities having irregularly weighted contributions toward achieving the objectives. The objective monitoring module may be configured to determine objective metrics for the users in a game space, based on the weighted activity metrics for the users, such that a first user having completed a first activity may have a higher objective metric value than a second user who has completed a second activity and a third activity.

The objective monitoring module may be configured to determine a second objective metric value for a second user. The second objective metric value may be based upon one or more activity metric values for the second user. The objective monitoring module may be configured to determine a hierarchy for the first objective metric value for the first user and the second objective metric value for the second user. The hierarchy of the first objective metric value of the first user and the second objective metric value for the second user providing an indication of which user has progressed further toward achieving the objective. The user with the greater progress toward achieving the objective appearing higher in the hierarchy than a user with less progress toward achieving the objective. The objective monitoring module may be configured to determine the objective metric values for any number of users, and determine a hierarchy for the any number of users.

The objective monitoring module may be configured to determine the objective metrics for many users where the users may be required to perform different activities in order to achieve an objective. For example, a first user may be required to complete a first activity and a second activity to achieve an objective, as defined by an administrator. A second user may be required to complete a third activity to achieve the objective. Differences in requirements for the users to achieve the objective may be based on one or more user parameters indicating differences in the users.

The progress presentation module may be configured to effectuate presentation of the objective metric values determined for the users according to a hierarchy of the objective metric values for the users, in response to obtaining the administrator-defined objective. Such presentation may be in the form of a leaderboard presented to the users individually as a user-specific leaderboard. Such presentation may be in response to obtaining the administrator-defined objective, or in response to an indication that the user has started to work toward achieving the administrator-defined objective. The progress presentation module may be configured to effectuate presentation of the first objective metric value determined for the first user, to the first user. Similarly, the progress presentation module may be configured to effectuate presentation of a second objective metric value determined for a second user, to the second user.

The progress presentation module may be configured to effectuate presentation of the first objective metric value determined for the first user and the second objective metric value determined for the second user according to the determined hierarchy of the first objective metric value and the second objective metric value. The progress presentation module may be configured to effectuate presentation of the objective metric values, to the users, according to a hierarchy, as determined by the objective monitoring module, together with the objective metric values of one or more other users in the game. The one or more other users, compared in the hierarchy, may be all other users participating in pursuing the objective, a selection of users affiliated with the first user, for example users having an indication that they interact with the first user using electronic social media, users which have formed an alliance or guild within the game space, users having similar demographics, such as geography or affiliations with real-world organizations such as universities or businesses, and/or any other combination of users having one or more like parameters or characteristics.

The progress presentation module may be configured to effectuate presentation of the first activity metric value determined for the users according to a hierarchy of the first activity metric values determined for the users. Each activity required to be completed to achieve the objective may have an associated leaderboard. Similarly, each action required to be taken to complete an activity may have an associated leaderboard. Each leaderboard may compare the user's objective, activity or action metric value with the metric values of one or more other users.

The motivational module may be configured to effectuate presentation to the first user of a motivational message, wherein the motivational message comprises an indication of the hierarchy of the objective metric value for the first user. The motivational message may provide an indication that the user is near to achieving the objective, has a relatively high objective metric value compared to other users, and/or provide some other indication of the user's progress toward achieving the objective. The motivational module may be further configured to effectuate presentation to the first user of one or more incentives for achieving a relatively high objective metric value in the hierarchy of objective metric values. The motivational module may be configured to effectuate presentation to the first user of one or more incentives for achieving the objective defined by an administrator.

Incentives may be available to the users at various stages of accomplishing the objective. Incentives may be available for reaching the top of the objective leaderboard, being an indication of which user is closest to achieving the objective. Similarly, incentives may be available for reaching the top of each of the activity leaderboards or action leaderboards. Incentives may be available for achieving the objective in the shortest period of time, for reaching the top of a leaderboard in the shortest period of time, for achieving the objective or completing an activity with the fewest actions, or for any other measurable stage in a user's progress toward achieving the objective.

Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
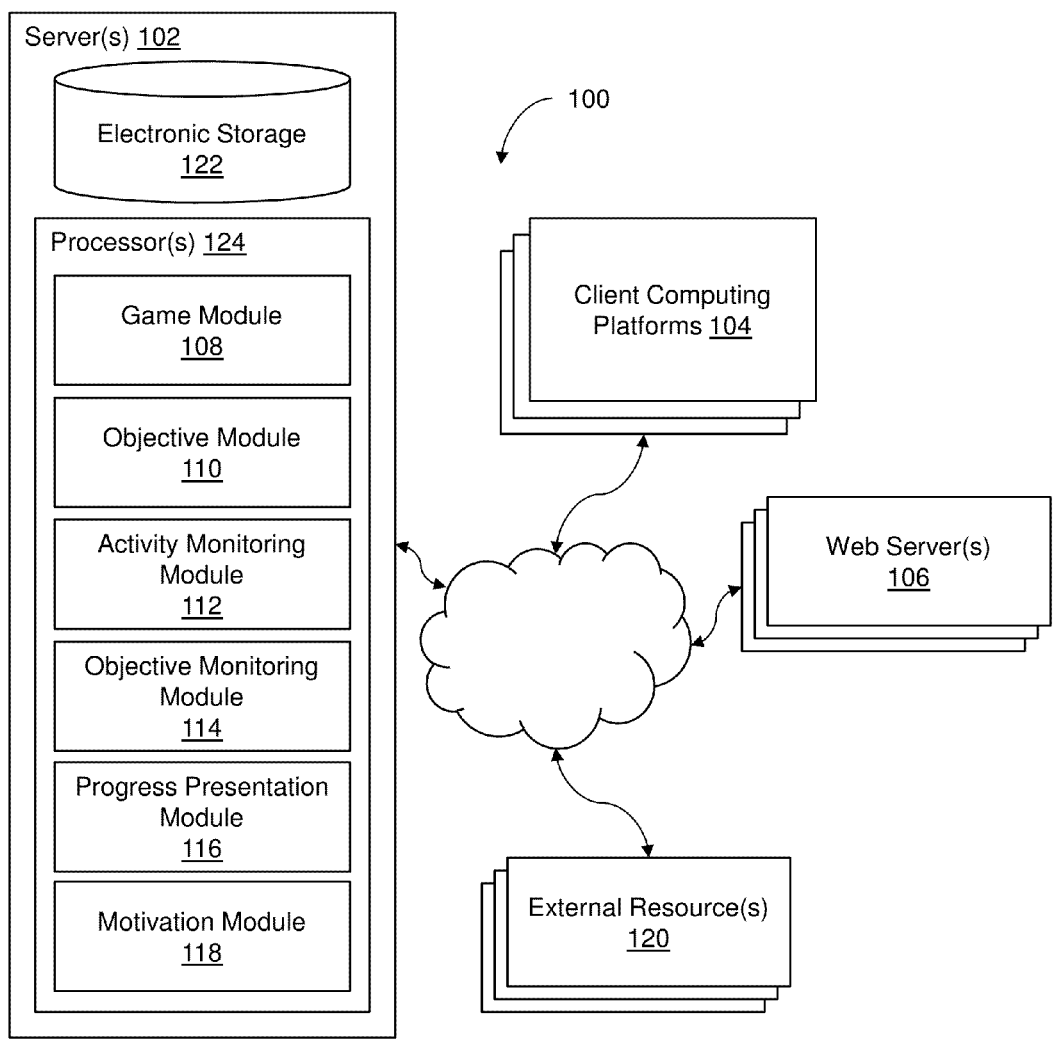
FIG. 1 illustrates a system configured to facilitate providing leaderboards to users based on in-game events, in accordance with one or more implementations.

FIG. 1 illustrates a system 100 configured to facilitate providing leaderboards to users based on in-game events, in accordance with one or more implementations. A game may have many leaderboards associated with different elements within the game. For example, the game may have one or more administrator-defined objectives. At least one of the one or more objectives may have associated activities which are required to be completed to achieve the objective. There may be provided a leaderboard for each objective and/or each associated activity displaying the hierarchy of each user with respect to other users in accomplishing the objective and/or completing the activities. Providing leaderboards for each objective and/or activity incentivizes users to keep working toward the particular objective, improving player retention. By providing leaderboards for sub-elements of the game, instead of only providing a single high-score leaderboard, creates increased opportunity for a user to feature on a leaderboard early in the game, increasing the incentive to the user to play, and improving user retention.

The leaderboards may feature a subset of users from the pool of all users playing the game or working toward achieving the objective. The subset of users may be affiliated or associated with the user to which the leaderboard is presented. The subset of users may be selected based on an indication of one or more user parameters. Such user parameters may include an indication of users commonly interacted within the game space, electronic social media locations of the user, groups or guilds that the user belongs to, geographic location of the user, an indication of the user's real-world affiliations, and/or other user parameters indicating the user has a connection with one or more other users. Providing leaderboards featuring a subset of users having a common attribute and/or affiliation increases competitiveness in the users, providing an incentive to continue playing, improving user retention.

The system 100 may include one or more servers 102. The server(s) 102 may be configured to communicate with one or more client computing platforms 104 according to a client/server architecture. The users may access the system 100 via the client computing platforms 104. Client computing platforms 104 may include, but not be limited to, personal computers, laptops, and/or handheld devices such as smartphones, tablets, and PDAs. The server(s) 102 may be configured to communicate with the one or more client computing platforms 104 through a network, such as the Internet. Web servers 106 may be utilized to facilitate communication between the server(s) 102 and the client computing platforms 104, where web servers 106 may host one or more websites associated with the online game. The server(s) 102 may communicate with the client computing platform(s) 104 and/or web server(s) 106 through a network, such as the Internet. In some implementations, the server(s) 102 may include the web server(s) 106.

The server(s) 102 may be configured to execute one or more computer program modules to facilitate providing leaderboards to users based on in-game events. The computer program modules may include one or more of a game module 108, an objective module 110, an activity monitoring module 112, an objective monitoring module 114, a progress presentation module 116, a motivation module 118 and/or other modules. In some implementations, the client computing platforms 104 may be configured to execute one or more computer program modules that are the same as or similar to the computer program modules of the server(s) 102 to facilitate providing leaderboards to users based on in-game events.

A given client computing platform 106 may include one or more processors configured to execute computer program modules. The computer program modules may be configured to enable an expert or user associated with the given client computing platform 104 to interface with system 100, web servers 106, and/or external resources 120, and/or provide other functionality attributed herein to client computing platforms 104. By way of non-limiting example, the given client computing platform 106 may include one or more of a desktop computer, a laptop computer, a handheld computer, a tablet computing platform, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 100 may be provided by resources included in system 100.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 122, information received from server(s) 102, information received from client computing platforms 104, and/or other information that enables server(s) 102 to function as described herein.

Processor(s) 124 is configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 108, 110, 112, 114, 116, 118 and/or other modules. Processor(s) 124 may be configured to execute modules 108, 110, 112, 114, 116, 118 and/or other modules by software; hardware; firmware; some combination of software, hardware, and/or firmware; and/or other mechanisms for configuring processing capabilities on processor(s) 124.

It should be appreciated that although modules 108, 110, 112, 114, 116, and 118 are illustrated in FIG. 1 as being co-located within a single processing unit, in implementations in which processor(s) 124 includes multiple processing units, one or more of modules 108, 110, 112, 114, 116, 118 and/or other modules may be located remotely from the other modules. The description of the functionality provided by the different modules 108, 110, 112, 114, 116, 118 and/or other modules described below is for illustrative purposes, and is not intended to be limiting, as any of modules 108, 110, 112, 114, 116, 118 and/or other modules may provide more or less functionality than is described. For example, one or more of modules 108, 110, 112, 114, 116, 118 and/or other modules may be eliminated, and some or all of its functionality may be provided by other ones of modules 108, 110, 112, 114, 116, 118 and/or other modules. As another example, processor 124 may be configured to execute one or more additional modules that may perform some or all of the functionality attributed below to one of modules 108, 110, 112, 114, 116, 118 and/or other modules.

The game module 108 may be configured to execute an instance of an online game. The game module 108 may be further configured to implement the instance of the online game to facilitate interaction of the users with the game. The game module 108 may be configured to execute an instance of a virtual space, in which the online game is implemented. The game module 108 may be configured to facilitate presentation of the virtual space to the user. The game module 108 may also be configured to facilitate interaction of the users with the online game by executing actions in the instance of the online game in response to receiving action requests from the users. In other implementations, the game module 108 may be configured to execute an instance of a two-dimensional online game, whereby users interact with the two-dimensional game using the client computing platforms 104.

The game module 108 may be configured to provide one or more virtual environments to users via client computing platforms 104. As used herein, a "virtual environment" may include a virtual space, one or more interactive, electronic social media, and/or other virtual environments.

A virtual environment may comprise a simulated space that is accessible by users via clients (e.g., client computing platforms 104) that present the views of the virtual environment to a user. Web servers 106 may also be used to provide a virtual environment to the users, where the web servers 106 are in operable communication with the client computing platforms 104 and server(s) 102. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space/environment are determined by game module 108 is not intended to be limiting. The game module 108 may be configured to express the virtual environment in a more limited, or more rich, manner. For example, views determined for the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 108, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user-controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platforms 104. The users may interact with each other through communications exchanged within the virtual environment. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through game module 108).

Interactive, electronic social media may include one or more of a social network, a virtual environment, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the microblogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The objective module 110 may be configured to obtain an objective definition of an administrator specified objective to be achieved by users of the game as part of a limited time event. The users' progress toward achieving the objective may be automatically presented to the users individually in a user-specific leaderboard. The objective may require one or more activities in the game associated with the objective to be completed by users. The user's progress toward completing the activities may be automatically presented to users individually in a user-specific leaderboard.

The objective may be a time-limited event within the game space of the online game. Examples of administrator-defined objectives may include at least one of exploring a map, researching a technology or skill, purchasing an in-game item, harvesting a specified type of resource, defeating one or more other players in player-versus-player combat, defeating non-player characters, participating and completing player-versus-environment activities, completing quests, and/or completing an in-game achievement. Other administrator-defined objectives may include occupying a particular area of a virtual environment, cultivating a defined amount and/or variety of a particular product or resource, building a game item, such as a city or building, forming an alliance with other users, progressing to another level within the game, and/or other any other objective which may be defined by an administrator.

The activity monitoring module 112, may be configured to monitor interactions of the users with the game and/or each other within the game in response to the objective being obtained by the objective module 110. Where the game module 108 has implemented a virtual environment, the activity monitoring module 112 may be configured to monitor interactions of the users with the virtual environment, one or more objects within the virtual environment, and/or each other. This may include monitoring, for a given user, areas the given user views or interacts with or within the game and/or virtual environment, other users the given user interacts with, the nature and/or content of interactions of the given user with other users, activities participated in within the game and/or virtual environment, level, powers, or skill attained in the game associated with various tasks, skills, or events within the game, inventory items obtained in the game, and/or other interactions of the given user with the game, virtual environment and/or other users. Some or all of the information generated by activity monitoring module 112 in monitoring the interactions of the users may be stored. Such storage may occur within user profiles managed by one or more computer program modules.

The activity monitoring module 112 may be configured to determine one or more activity metrics for the users indicating a level of progress toward completing one or more activities. The activity metrics may be based upon the users' progress toward completing the activities defined in the objective definition. The activity monitoring module 112 may be configured to determine a first activity metric value for a first user based upon the first user's progress toward completing a first activity. An objective may have one or more associated activities, whereby the activities are required to be completed before the objective can be accomplished.

The associated activities may be defined by an administrator, or one or more computer program modules may be able to determine the associated activities from the definition of the objective defined by an administrator. As a non-limiting example, the objective may be to complete a quest within the game. To complete the quest the player may be required to obtain an object B to defeat a non-player character C. Object B may be obtained by the user by interacting with the topography within the instance of the game. The object B may be stored within an inventory associated with the user. The definition of the administrator-defined objective may include the requirements to complete a first activity, related to obtaining the object B, and a second activity, related to defeating the non-player character C. In other implementations, the one or more computer programs may be configured to determine, upon an administrator defining an objective as requiring users to complete a quest, that users must obtain an object B in order to defeat non-player character C. The activity monitoring module 112 may be configured to determine a first activity metric value indicating the user's progress toward obtaining object B, and a second activity metric value indicating the user's progress toward defeating non-player character C, in response to the objective being defined. The activity monitoring module 112 may be configured to determine activity metrics for users based on the objects stored within the user's inventory.

Some activities required to be completed to achieve an objective require the user to undertake one or more actions. Such that, individual ones of the one or more activities require users to complete multiple actions defined in the objective definition, such that a third activity requires users to complete a first action and a second action. For example, to obtain an object B, necessary in order to complete a quest, the user may be required to perform actions D and E. The performance of actions D and E may be defined by an administrator as being required to obtain object B. In alternative implementations, the one or more computer program modules may be configured to determine that obtaining object B requires the performance of actions D and E.

The activity monitoring module 112 may be configured to determine a first action metric value and a second action metric value for the first user indicating the first user's progress toward completing the first action and the second action. For example, the first action metric value may be associated with a progress toward performance of action D, and the second action metric value may be associated with a progress toward performance of action E. The activity monitoring module 112 may be configured to determine the third activity metric value indicating the first user's progress toward completing the third activity, based on the first action metric value and the second action metric value. The activity monitoring module 112 may be configured to account for a difference in respective contributions, toward the user's progress toward completing the third activity, from the first action metric value and the second action metric value when determining the third activity metric value.

The objective monitoring module 114 may be configured to determine an objective metric for the users indicating the users' progress toward achieving the objective. The users' progress toward achieving the objective may be based upon the one or more activity metrics for the user. The objective monitoring module 114 may be configured to determine a first objective metric value for the first user based upon the first activity metric value for the first user. The objective monitoring module 114 may be configured to determine a first objective metric value for the first user based on a second activity metric for the first user, such that the first activity metric and the second activity metric may indicate the first user's progress of two otherwise distinct activities, in furtherance of achieving the defined objective.

Different activities, required to be completed to achieve the objective, may have different associated complexities and/or time requirements, providing activities having irregularly weighted contributions toward achieving the objectives. The objective monitoring module 114 may be configured to determine objective metrics for the users in a game space, based on the weighted activity metrics for the users, such that a first user having completed a first activity may have a higher objective metric value than a second user who has completed a second activity and a third activity.

The objective monitoring module 114 may be configured to determine a second objective metric value for a second user. The second objective metric value may be based upon one or more activity metric values for the second user. The objective monitoring module 114 may be configured to determine a hierarchy for the first objective metric value for the first user and the second objective metric value for the second user. The hierarchy of the first objective metric value of the first user and the second objective metric value for the second user provides an indication of which user has progressed further toward achieving the objective. The user with the greater progress toward achieving the objective appears higher in the hierarchy than a user with less progress toward achieving the objective. The objective monitoring module may be configured to determine the objective metric values for any number of users, and determine a hierarchy for the any number of users.

The objective monitoring module 114 may be configured to determine a set of users that are currently engaged with the game. Being engaged with the game may refer to being logged in to the game, performing some action or interaction within the game within some period of time (e.g., the last 2 minutes), and/or taking some other action indicating ongoing and contemporaneous engagement with the game.

The objective monitoring module 114 may be configured to determine the objective metrics for many users where the users may be required to perform different activities in order to achieve an objective. For example, a first user may be required to complete a first activity and a second activity to achieve an objective, as defined by an administrator. A second user may be required to complete a third activity to achieve the objective. Differences in requirements for the users to achieve the objective may be based on one or more user parameters indicating differences in the users.

The progress presentation module 116 may be configured to effectuate presentation of the objective metric values determined for the users according to a hierarchy of the objective metric values for the users, in response to obtaining the administrator-defined objective. Such presentation may be in the form of a leaderboard presented to the users individually as a user-specific leaderboard. Such presentation may be in response to obtaining the administrator-defined objective, or in response to an indication that the user has started to work toward achieving the administrator-defined objective. The progress presentation module 116 may be configured to effectuate presentation of the first objective metric value determined for the first user, to the first user. Similarly, the progress presentation module 116 may be configured to effectuate presentation of a second objective metric value determined for a second user, to the second user.

The progress presentation module 116 may be configured to effectuate presentation of the first objective metric value determined for the first user and the second objective metric value determined for the second user according to the determined hierarchy of the first objective metric value and the second objective metric value. The progress presentation module 116 may be configured to effectuate presentation of the objective metric values, to the users, according to a hierarchy, as determined by the objective monitoring module 114, together with the objective metric values of one or more other users in the game. The one or more other users, compared in the hierarchy, may be all other users participating in pursuing the objective, a selection of users affiliated with the first user, for example users having an indication that they interact with the first user using electronic social media, users which have formed an alliance or guild within the game space, users having similar demographics, such as geography or affiliations with real-world organizations such as universities or organizations, and/or any other combination of users having one or more like parameters. In some implementations, the users presented in the hierarchy may be users currently engaged with the game, or may be users not currently engaged with the game, or a combination thereof.

The progress presentation module 116 may be configured to effectuate presentation of the first activity metric value determined for the users according to a hierarchy of the first activity metric values determined for the users. Each activity required to be completed to achieve the objective may have an associated leaderboard. Similarly, each action required to be taken to complete an activity may have an associated leaderboard. Each leaderboard may compare the user's objective, activity or action metric value with the metric values of one or more other users.

Figure 2:
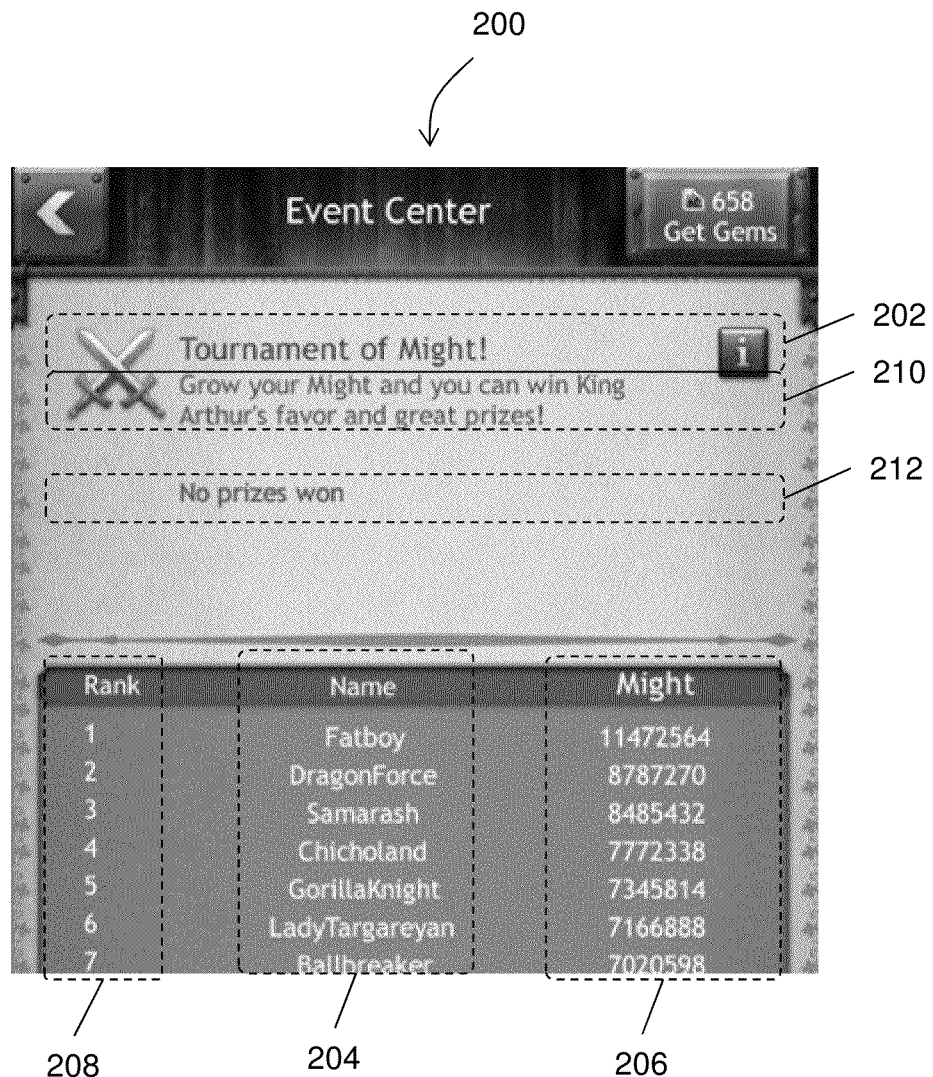
FIG. 2 illustrates a leaderboard provided to users based on in-game events, in accordance with one or more implementations.

FIG. 2 illustrates a leaderboard 200 provided to users based on in-game events, in accordance with one or more implementations. The leaderboard 200 may comprise an objective title 202, providing the user an indication of which objective the leaderboard 200 pertains. The objective may be defined by an administrator, whereby the individual activities and/or actions required to be completed and/or performed by the user are defined and/or determined. For example, as illustrated in FIG. 2, the objective, associated with leaderboard 200, may be defined as a user, or a user's avatar or character, achieving a certain amount of might.

The leaderboard 200 may include a user group 204. The user group may comprise a group of users selected based upon a common characteristic or parameter. Common characteristics or parameters may include each player working toward achieving the same objective, being associated with one another in the game, such as in a guild or alliance, being associated with one another in electronic social media, having a common regional location in the virtual environment, or in the real-world, belonging to a common organization such as a college, business or interest group, and/or any other commonly held characteristic.

The users presented on the leaderboard may have an associated objective metric value 206, indicating each displayed user's progress toward achieving the objective. In the case illustrated in FIG. 2, the leaderboard 200 may comprise an indication of the amount of might obtained by each of the displayed users in the user group 204. The objective metric value 206, determined by the objective metric monitoring module 114, may be based upon one or more activity metric values for the users, and/or action metric values for the users. The leaderboard 200 may present the group of users 204 according to their relative hierarchy, or rank, 208 within the group 204. The group 204 may be a small subset of all users attempting to achieve the objective. Therefore the relative hierarchy, or rank 208, of even the highest user displayed on the leaderboard 200 may be relatively low compared to a group comprising all users. The group of users 204 may be selected based upon an indication that the first user, to whom the leaderboard 200 is presented, has a relatively high rank within the rank 208 of the group 204. Providing a leaderboard 200 to the first user indicating that the first user has a relatively high rank 208 within the selected group of users 204 incentivizes the first user to continue playing to achieve the objective, improving user retention and monetization.

It would be understood by one of ordinary skill in the art that the leaderboards may not be limited to the embodiment illustrated in FIG. 2. The leaderboard 200 may be associated with an objective, an activity, an action, or a combination thereof.

The motivational module 118 may be configured to effectuate presentation to the first user of a motivational message, wherein the motivational message comprises an indication of the hierarchy of the objective metric value for the first user. The motivational message may provide an indication that the user is near to achieving the objective, has a relatively high objective metric value compared to other users, and/or provide some other indication of the user's progress toward achieving the objective. The motivational module 118 may be further configured to effectuate presentation to the first user of one or more incentives for achieving a relatively high objective metric value in the hierarchy of objective metric values. The motivational module 118 may be configured to effectuate presentation to the first user of one or more incentives for achieving the objective defined by an administrator.

The motivational module 118 may be configured to effectuate presentation to the first user of a motivational message 210 in leaderboard 200. The motivational message 210 may provide an indication of an incentive available to the user for achieving the objective. Alternatively, where the leaderboard 200 relates to activities and/or actions, the motivational message 210 may provide an indication of an incentive for completing an activity or performing an action. The motivational module 118 may be configured to effectuate presentation to the first user of prizes won 212 during the first user's attempt to achieve the objective.

Incentives may be available to the users at various stages of accomplishing the objective. Incentives may be available for reaching the top of the objective leaderboard, being an indication of which user is closest to achieving the objective. Similarly, incentives may be available for reaching the top of each of the activity leaderboards or action leaderboards. Incentives may be available for achieving the objective in the shortest period of time, for reaching the top of a leaderboard in the shortest period of time, for achieving the objective or completing an activity with the fewest actions, or for any other measurable stage in a user's progress toward achieving the objective.

Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

Figure 3:
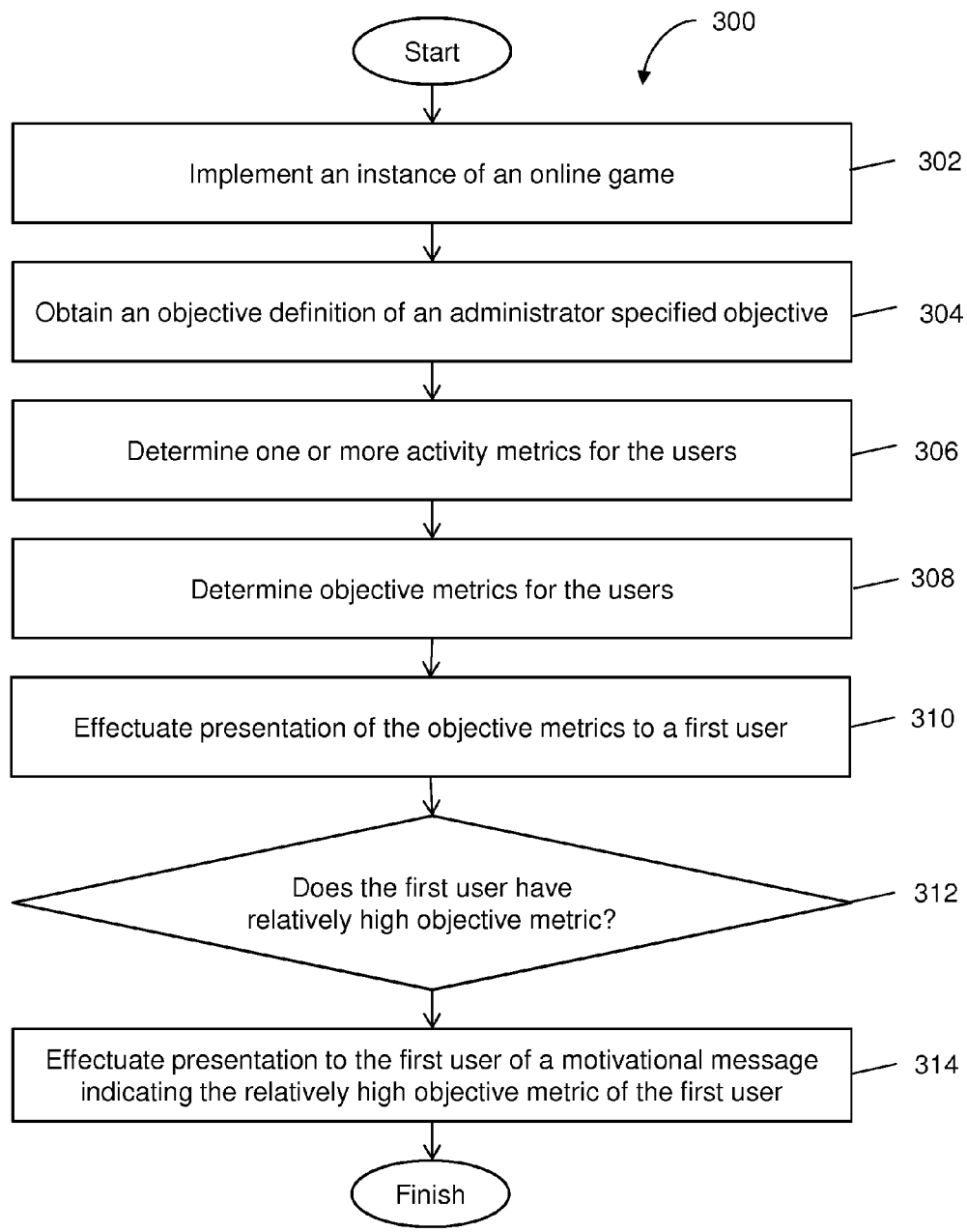
FIG. 3 illustrates a method for providing a leaderboard based upon in-game events within a game space, according to one or more implementations.

FIG. 3 illustrates a method 300 for providing a leaderboard based upon in-game events within a game space implemented on a computer system that includes one or more physical processors. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302 an instance of an online game to facilitate interaction of the users with the game may be implemented. The implemented online game may include an instance of a virtual environment having a 2-dimensional or 3-dimensional topography, and one or more objects within the topography. Users may interact with the topography and/or the one or more objects within the topography. Operation 302 may be performed by a game module that is the same as or similar to game module 108, in accordance with one or more implementations.

At an operation 304 an objective definition of an administrator-specified objective may be obtained. The objective may be achieved by users of the game as part of a limited time event. The objective may require one or more activities in the game associated with the objective to be completed by users. Operation 304 may be performed by an objective module that is the same as or similar to objective module 110, in accordance with one or more implementations.

At an operation 306 one or more activity metrics for the users based upon the users' progress toward completing the activities defined in the objective definition may be determined. Activity metrics may be determined such that a first activity metric value for a first user, based upon the first user's progress toward completing a first activity, may be determined. A second activity metric value for the first user, based upon the first user's progress toward completing a second activity may be determined. Individual ones of the one or more activities may require users to complete multiple actions defined in the objective definition, such that a third activity requires users to complete a first action and a second action. Operation 306 may be performed by an activity monitoring module that is the same as or similar to activity monitoring module 112, in accordance with one or more implementations.

At an operation 308 an objective metric for the users indicating the users' progress toward achieving the objective may be determined. The objective metrics may be based upon the one or more activity metrics for the users, such that a first objective metric value for the first user based upon the first activity metric value for the first user may be determined. In some implementations, at an operation 308, a second objective metric value for a second user, wherein the second objective metric value is based upon one or more activity metric values for the second user, may be determined. Operation 308 may be performed by an objective monitoring module that is the same as or similar to objective monitoring module 114, in accordance with one or more implementations.

In some implementations hierarchy for the first objective metric value for the first user and the second objective metric value for the second user may be determined. Such determination may be performed by an objective monitoring module that is the same as or similar to objective monitoring module 114, in accordance with one or more implementations.

At an operation 310, presentation of the objective metric values determined for the users according to a hierarchy of the objective metric values for the users may be effectuated. The presentation of the objective metric values may be effectuated for individual users, such that the presentation to a first user is different than the presentation to the second user. For example, presentation of the first objective metric value determined for the first user and the second objective metric value determined for the second user may be effectuated. Such objective metric values may be presented according to the determined hierarchy of the first objective metric value and the second objective metric value. The presentation of the relative hierarchies to the first user may include an indication of the objective metric values for a set of one or more other users. The set of users may be selected based on one or more characteristics shared with the first user. The set of users may be selected such that the first user has an objective metric value that is relatively high compared to the objective metric values of set of users, allowing the first user to appear relatively high in the presentation of objective metric values. Having the first user appearing relatively high in the presentation of objective metric values increases the user's incentive to keep playing to achieve the highest position, thereby improving player retention and monetization. Operation 310 may be performed by a presentation module that is the same as or similar to presentation module 116, in accordance with one or more implementations.

In some implementations, presentation of the first activity metric value determined for the users according to a hierarchy of the first activity metric values determined for the users, may be effectuated. Such a presentation may be performed by a presentation module that is the same as or similar to presentation module 116, in accordance with one or more implementations.

Presentation of an objective activity metric value or a first activity metric value of the first user, and the set of users, according to a hierarchy of objective activity metric values, or activity metric values, respectively, may be in the form of a leaderboard. The leaderboard may be tailored to the first user and presented to the first user.

At an operation 312, a determination of whether the first user has a relatively high objective metric value, compared to the set of users, is made. Operation 312 may be performed by an objective monitoring module that is the same as or similar to objective monitoring module 114, in accordance with one or more implementations.

At an operation 314, in response to a determination, at operation 312, that the first user has a relatively high objective metric value compared to the set of users, presentation to the first user of a motivational message may be effectuated. The motivation message may comprise an indication of the hierarchy of the objective metric value for the first user. Operation 314 may be performed by a motivational module that is the same as or similar to motivational module 118, in accordance with one or more implementations.

Presentation, to the first user of one or more incentives for achieving a relatively high objective metric value in the hierarchy of objective metric values, may be effectuated. Similarly, presentation, to the first user of one or more incentives for achieving the objective defined by an administrator, may be effectuated. The incentives may include one or more virtual items, other amounts of virtual currency, access to areas in the game space that were previously not accessible to the first user, quests in the game space that were previously not available to the first user, and/or any other incentive to incentivize the user to continue playing the game to achieve the objective. Such presentation may be performed by a motivational module that is the same as or similar to motivational module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a leaderboard based upon in-game events within a game space, the system comprising:
   one or more processors configured to execute computer program modules, the computer program modules comprising:
   a game module configured to execute an instance of an online game, and to implement the instance to facilitate interaction by users with the game;
   an objective module configured to obtain an objective definition of an administrator-specified objective to be achieved by users of the game as part of a limited time event within the game, wherein the objective requires one or more activities to be performed in the game, the one or more activities associated with the objective to be completed by users;
   an activity monitoring module configured to determine one or more activity metrics for the users based upon the users' progress toward completing the activities defined in the objective definition, such that the activity monitoring module is configured to determine a first activity metric value for a first user based upon the first user's progress toward completing a first activity;
   an objective monitoring module configured to determine objective metrics, wherein an objective metric has an objective metric value, for the users indicating the users' progress toward achieving the objective, based upon the one or more activity metrics for the users, such that the objective monitoring module is configured to determine a first objective metric value for the first user based upon the first activity metric value for the first user; and,
   a progress presentation module configured to effectuate presentation of the objective metric values for the users, the presentation of the objective metric values determined for the users according to a hierarchy of the objective metric values for the users.

2. The system of claim 1, wherein the objective monitoring module is further configured to:
   determine a second objective metric value for a second user, wherein the second objective metric value is based upon one or more activity metric values for the second user, and
   determine a hierarchy for the first objective metric value for the first user and the second objective metric value for the second user; and,
   wherein the progress presentation module is further configured to:
   effectuate presentation of the first objective metric value determined for the first user and presentation of the second objective metric value determined for the second user, the presentation of the first objective metric value and the second objective metric value determined according to the determined hierarchy of the first objective metric value and the second objective metric value.

3. The system of claim 1, wherein individual ones of the one or more activities require users to complete multiple actions defined in the objective definition, such that a third activity requires users to complete a first action and a second action.

4. The system of claim 3, wherein the activity monitoring module is further configured to determine a first action metric value and a second action metric value for the first user indicating the first user's progress toward completing the first action and the second action, and wherein the activity monitoring module is configured to determine the third activity metric value indicating the first user's progress toward completing the third activity, based on the first action metric value and the second action metric value.

5. The system of claim 1, further comprising a motivation module configured to effectuate presentation to the first user of a motivation message, wherein the motivation message comprises an indication of the hierarchy of the objective metric value for the first user.

6. The system of claim 5, wherein the motivation module is further configured to effectuate presentation to the first user of one or more incentives for achieving a relatively high objective metric value in the hierarchy of objective metric values.

7. The system of claim 6, wherein the incentives include one or more of virtual items, amounts of virtual currency, access to areas in the game space that were previously not accessible to the first user, or access to quests in the game space that were previously not available to the first user.

8. The system of claim 1, further comprising a motivation module configured to effectuate presentation to the first user of one or more incentives for achieving the objective defined by an administrator.

9. The system of claim 8, wherein the incentives include one or more of virtual items, amounts of virtual currency, access to areas in the game space that were previously not accessible to the first user, or access to quests in the game space that were previously not available to the first user.

10. The system of claim 1, wherein the progress presentation module is further configured to effectuate presentation to the first user of the first activity metric value determined for the first user according to a hierarchy of the first activity metric values determined for other users.

11. A method for providing a leaderboard based upon in-game events within a game space implemented on a computer system that includes one or more physical processors, the method comprising:
   implementing an instance of an online game to facilitate interaction by users with the game;
   obtaining an objective definition of an administrator-specified objective to be achieved by users of the game as part of a limited time event within the game, wherein the objective requires one or more activities to be performed in the game, the one or more activities associated with the objective to be completed by users;

determining one or more activity metrics for the users based upon the users' progress toward completing the activities defined in the objective definition, such that a first activity metric value for a first user based upon the first user's progress toward completing a first activity is determined;

determining objective metrics, wherein an objective metric has an objective metric value, for the users indicating the users' progress toward achieving the objective, based upon the one or more activity metrics for the users, such that a first objective metric value for the first user based upon the first activity metric value for the first user is determined; and, effectuating presentation of the objective metric values for the users, the presentation of the objective metric values determined for the users according to a hierarchy of the objective metric values for the users.

12. The method of claim 11, further comprising:

determining a second objective metric value for a second user, wherein the second objective metric value is based upon one or more activity metric values for the second user;

determining a hierarchy for the first objective metric value for the first user and the second objective metric value for the second user; and, effectuating presentation of the first objective metric value determined for the first user and presentation of the second objective metric value determined for the second user, the presentation of the first objective metric value and the second objective metric value determined according to the determined hierarchy of the first objective metric value and the second objective metric value.

13. The method of claim 11, wherein individual ones of the one or more activities require users to complete multiple actions defined in the objective definition, such that a third activity requires users to complete a first action and a second action.

14. The method of claim 13, further comprising:

determining a first action metric value and a second action metric value for the first user indicating the first user's progress toward completing the first action and the second action; and, determining the third activity metric value indicating the first user's progress toward completing the third activity, based on the first action metric value and the second action metric value.

15. The method of claim 11, further comprising effectuating presentation to the first user of a motivational message, wherein the motivational message comprises an indication of the hierarchy of the objective metric value for the first user.

16. The method of claim 15, further comprising effectuating presentation to the first user of one or more incentives for achieving a relatively high objective metric value in the hierarchy of objective metric values.

17. The method of claim 16, wherein the incentives include one or more of virtual items, amounts of virtual currency, access to areas in the game space that were previously not accessible to the first user, or access to quests in the game space that were previously not available to the first user.

18. The method of claim 11, further comprising effectuating presentation to the first user of one or more incentives for achieving the objective defined by an administrator.

19. The method of claim 18, wherein the incentives include one or more of virtual items, amounts of virtual currency, access to areas in the game space that were previously not accessible to the first user, or access to quests in the game space that were previously not available to the first user.

20. The system of claim 11, further comprising effectuating presentation to the first user of the first activity metric value determined for the first user according to a hierarchy of the first activity metric values determined for other users.

\* \* \* \* \*